United States Patent
Wada et al.

(10) Patent No.: US 11,817,583 B2
(45) Date of Patent: Nov. 14, 2023

(54) NEGATIVE ELECTRODE FOR NON-AQUEOUS ELECTROLYTE SECONDARY BATTERY, AND NON-AQUEOUS ELECTROLYTE SECONDARY BATTERY

(71) Applicants: Panasonic Corporation, Kadoma (JP); Kao Corporation, Tokyo (JP)

(72) Inventors: Naoyuki Wada, Hyogo (JP); Atsushi Hiraishi, Nakayama (JP); Kei Takahashi, Takaishi (JP)

(73) Assignees: PANASONIC HOLDINGS CORPORATION, Kadoma (JP); KAO CORPORATION, Tokyo (JP)

( * ) Notice: Subject to any disclaimer, the term of this patent is extended or adjusted under 35 U.S.C. 154(b) by 780 days.

(21) Appl. No.: 16/649,803

(22) PCT Filed: Dec. 7, 2018

(86) PCT No.: PCT/JP2018/045154
§ 371 (c)(1),
(2) Date: Mar. 23, 2020

(87) PCT Pub. No.: WO2019/124122
PCT Pub. Date: Jun. 27, 2019

(65) Prior Publication Data
US 2020/0313192 A1   Oct. 1, 2020

(30) Foreign Application Priority Data
Dec. 21, 2017   (JP) .................................. 2017-244642

(51) Int. Cl.
*H01M 4/62* (2006.01)
*H01M 4/131* (2010.01)
(Continued)

(52) U.S. Cl.
CPC ........... *H01M 4/622* (2013.01); *H01M 4/131* (2013.01); *H01M 4/133* (2013.01); *H01M 4/364* (2013.01);
(Continued)

(58) Field of Classification Search
CPC . H01M 4/134; H01M 4/622; H01M 2004/027
See application file for complete search history.

(56) References Cited

U.S. PATENT DOCUMENTS

| 2002/0068783 A1* | 6/2002 | Maeda | H01M 4/62 524/474 |
| 2012/0094178 A1* | 4/2012 | Loveridge | H01M 4/622 252/514 |

(Continued)

FOREIGN PATENT DOCUMENTS

| CN | 104538637 A | 4/2015 |
| CN | 105103349 A | 11/2015 |

(Continued)

OTHER PUBLICATIONS

Office Action dated Mar. 8, 2022, issued in counterpart JP Application No. 2019-560972, with English Translation. (6 pages).

(Continued)

*Primary Examiner* — Brittany L Raymond
(74) *Attorney, Agent, or Firm* — WHDA, LLP

(57) ABSTRACT

A negative electrode constituting a non-aqueous electrolyte secondary battery, which is an example of an embodiment, comprises a negative-electrode mixture layer including a negative-electrode active material and a binder agent. The negative electrode includes, as the binder agent, at least a polymer constituted by a constituent unit A represented by formula (1), a constituent unit B represented by formula (2), (Continued)

and a constituent unit C represented by formula (3). The molar ratio (l/m) of the constituent unit A to the constituent unit B is from 0.2 to 1.8.

8 Claims, 1 Drawing Sheet

(51) Int. Cl.
*H01M 4/133* (2010.01)
*H01M 4/36* (2006.01)
*H01M 10/0525* (2010.01)
*H01M 4/02* (2006.01)

(52) U.S. Cl.
CPC .. *H01M 10/0525* (2013.01); *H01M 2004/027* (2013.01); *H01M 2300/0025* (2013.01)

(56) References Cited

U.S. PATENT DOCUMENTS

| | | | |
|---|---|---|---|
| 2015/0118556 A1* | 4/2015 | Jeong | H01M 4/622 524/832 |
| 2016/0079007 A1 | 3/2016 | Otsuka et al. | |
| 2016/0190591 A1 | 6/2016 | Shen et al. | |
| 2018/0040886 A1 | 2/2018 | Yokoi et al. | |
| 2018/0062160 A1* | 3/2018 | Kasamatsu | H01M 4/583 |
| 2018/0248191 A1 | 8/2018 | Liu et al. | |
| 2018/0281808 A1 | 10/2018 | Minegishi et al. | |
| 2020/0381734 A1* | 12/2020 | Hiraishi | H01M 4/1393 |

FOREIGN PATENT DOCUMENTS

| | | |
|---|---|---|
| CN | 109565051 A | 4/2019 |
| EP | 3 493 305 A1 | 6/2019 |
| JP | 2000-195521 A | 7/2000 |
| JP | 2013-110108 A | 6/2013 |
| JP | 2017-62868 A | 3/2017 |
| JP | 2018-32623 A | 3/2018 |
| WO | 2008/078803 A1 | 7/2008 |
| WO | 2014/156195 A1 | 10/2014 |
| WO | 2016/136178 A1 | 9/2016 |
| WO | 2017/032320 A1 | 3/2017 |
| WO | 2017-168380 A | 9/2017 |

OTHER PUBLICATIONS

Notification Concerning Transmittal of International Preliminary Report on Patentability (Forms PCT/IB/326) issued in counterpart International Application No. PCT/JP2018/045154 dated Jul. 2, 2020 with Forms PCT/IB/308, PCT/IB/373, PCT/IB/338 and PCT/ISA/237. (14 pages).

International Search Report dated Mar. 12, 2019, issued in counterpart International Application No. PCT/JP2018/045154. (1 page).

Office Action dated Jul. 12, 2022, issued in counterpart to JP Application No. 2019-560972, with English Translation. (8 pages).

Office Action dated Aug. 15, 2022, issued in counterpart to CN Application No. 201880060669.6, with English Search Report and English Translation. (15 pages).

* cited by examiner

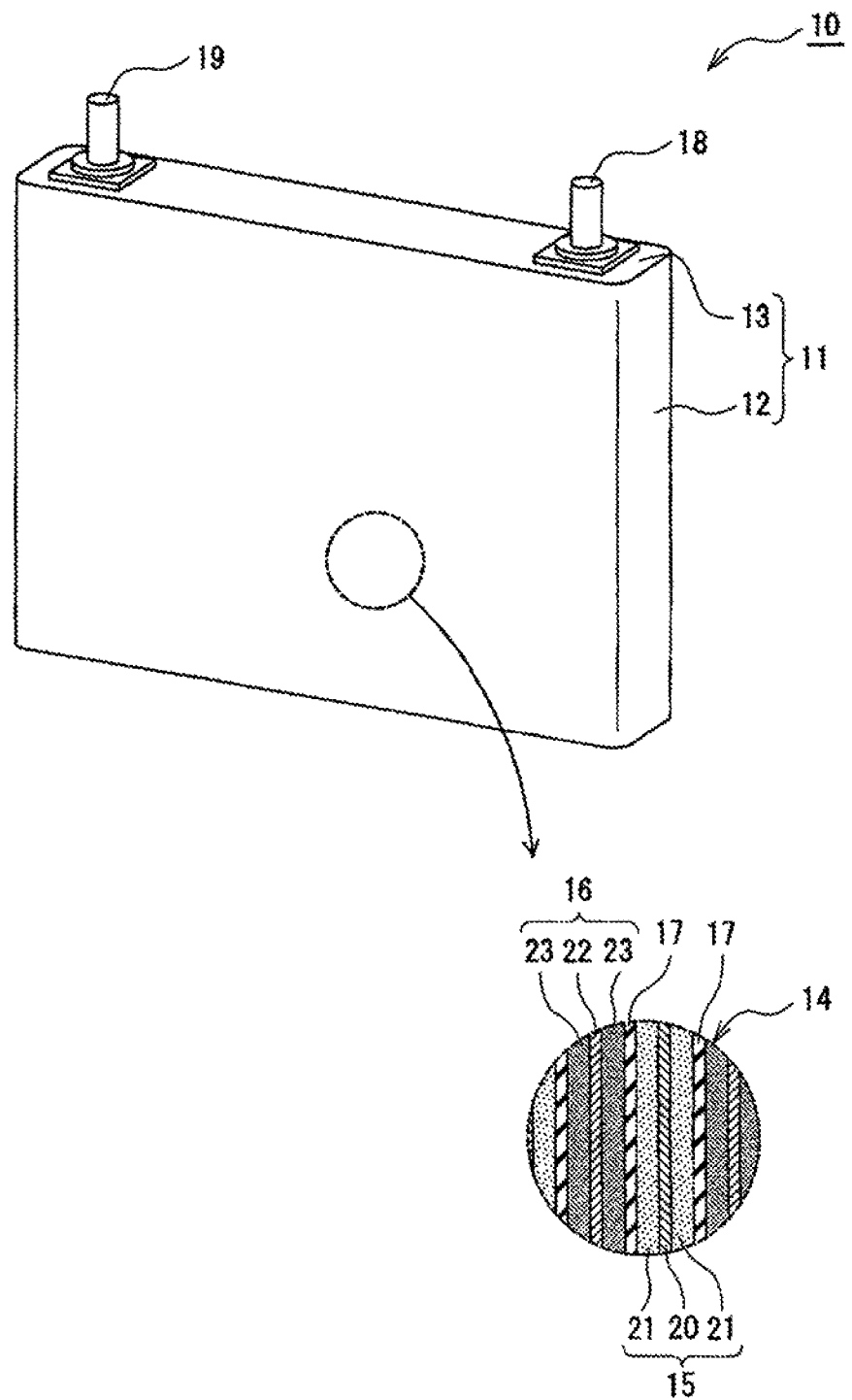

NEGATIVE ELECTRODE FOR NON-AQUEOUS ELECTROLYTE SECONDARY BATTERY, AND NON-AQUEOUS ELECTROLYTE SECONDARY BATTERY

CROSS REFERENCE TO RELATED APPLICATION

This application is a National Phase of PCT International Patent Application Number PCT/JP2018/045154, filed Dec. 7, 2018, claiming the benefit of priority of Japanese Patent Application Number 2017-244642 filed on Dec. 21, 2017, the entire contents of which are hereby incorporated by reference.

TECHNICAL FIELD

The present disclosure relates to a negative electrode for a non-aqueous electrolyte secondary battery, and a non-aqueous electrolyte secondary battery.

BACKGROUND

A negative electrode used for a non-aqueous electrolyte secondary battery such as a lithium ion secondary battery is typically composed of a negative electrode current collector and negative electrode mixture layers formed on both surfaces of the current collector. The negative electrode mixture layers include a negative electrode active material, and a binder for binding the particles of the negative electrode active material with one another and for binding the negative electrode active material with the current collector. As the performance of the binder greatly influences the battery characteristics, various binders are being developed for improving the battery characteristics, such as the cycle characteristic and the storage characteristic.

For example, Patent Literature 1 discloses a binder comprising a structural unit (a) derived from an ethylenic unsaturated carboxylic acid ester monomer and a structural unit (b) derived from an ethylenic unsaturated carboxylic acid monomer, wherein the weight ratio of the structural unit (a) to the structural unit (b) is 99~60/1~40. Patent Literature 2 discloses a binder obtained by polymerizing a monomer mixture containing a (meth)acrylic acid ester monomer having a boiling point of 145° C. or higher. Further, Patent Literature 3 discloses a binder comprising an alkyl-modified carboxyl group-containing copolymer obtained by copolymerizing a (meth)acrylic acid and a (meth)acrylic acid alkyl ester in which the number of carbons in the alkyl group is from 18 to 24.

CITATION LIST

Patent Literature

Patent Literature 1: JP 2000-195521 A
Patent Literature 2: WO 2014/156195
Patent Literature 3: JP 2017-62868 A

SUMMARY

Technical Problem

In a non-aqueous electrolyte secondary battery, it is an important issue to reduce transfer resistance of lithium ions at the negative electrode and to attain low battery resistance. In particular, battery resistance tends to increase under a low-temperature environment.

The present disclosure is directed to providing a negative electrode for a non-aqueous electrolyte secondary battery, the negative electrode being capable of attaining low battery resistance even under a low-temperature environment while maintaining good binding property of the negative electrode mixture layer. Conventional technologies including the technologies of Patent Literatures 1 to 3 still include potential for improvements regarding simultaneous achievement of good binding property of the negative electrode mixture layer and reduction of battery resistance.

Solution to Problem

A negative electrode for non-aqueous electrolyte secondary battery according to an aspect of the present disclosure is a negative electrode including a negative electrode mixture layer having a negative electrode active material and a binder. The negative electrode includes, as the binder, at least a polymer constituted by a constituent unit A represented by formula (1), a constituent unit B represented by formula (2), and a constituent unit C represented by formula (3). The molar ratio (1/m) of the constituent unit A to the constituent unit B is from 0.2 to 1.8.

(Formula 1)

[In formula 1, R1 denotes a straight chain alkyl group containing 1 to 4 carbons]

(Formula 2)

[In formula 2, R2 denotes an alkyl group containing 1 to 4 carbons]

(Formula 3)

[In formula 3, M denotes H and/or a monovalent metal atom]

A non-aqueous electrolyte secondary battery according to an aspect of the present disclosure comprises the above-described negative electrode.

Advantageous Effects of Invention

According to an aspect of the present disclosure, it is possible to provide a negative electrode for a non-aqueous electrolyte secondary battery, the negative electrode being capable of attaining low battery resistance even under a low-temperature environment while maintaining good binding property of the negative electrode mixture layer. In a non-aqueous electrolyte secondary battery comprising a negative electrode according to the present disclosure, an increase in battery resistance can be suppressed even under a low-temperature environment.

BRIEF DESCRIPTION OF DRAWINGS

FIG. 1 is a perspective view of a non-aqueous electrolyte secondary battery according to an example embodiment.

DESCRIPTION OF EMBODIMENTS

As noted above, it is an important issue to suppress an increase in battery resistance under a low-temperature environment while maintaining good binding property of the negative electrode mixture layer. The present inventors made diligent efforts in studies for solving this issue, and as a result, succeeded in simultaneously achieving good binding property and low battery resistance under a low-temperature environment by employing, as the binder of the negative electrode mixture layer, a polymer comprising the above-noted constituent units A, B, and C, wherein the molar ratio (l/m) of the constituent unit A to the constituent unit B is from 0.2 to 1.8.

Although the detailed mechanism of how the above-noted advantages are realized is not quite clear, a polymer comprising the above-noted constituent units A, B, and C wherein the molar ratio (l/m) of the constituent unit A to the constituent unit B is from 0.2 to 1.8 (hereinafter referred to as the "polymer P") easily absorbs and becomes swollen with an electrolytic solution, and it is considered that this feature is contributing to reduction of battery resistance. In a negative electrode mixture layer, the surface of the particles of the negative electrode active material is covered with the binder. The polymer P has high ion permeability, and does not inhibit the lithium ions contained in the electrolytic solution from moving to the particle surface of the negative electrode active material. In other words, it is considered that, by employing the polymer P as the binder, transfer resistance of the lithium ions at the negative electrode is reduced and battery characteristics are thereby enhanced. Further, according to the polymer P, good binding property of the negative electrode mixture layer can be attained.

In the following, an example embodiment of the present disclosure is described in detail by reference to the drawing.

FIG. 1 is a perspective view of a non-aqueous electrolyte secondary battery 10 according to an example embodiment. FIG. 1 shows the non-aqueous electrolyte secondary battery 10 having a rectangular battery housing 11. However, a non-aqueous electrolyte secondary battery according to the present disclosure is not limited to a rectangular battery, and may be a cylindrical or coin-shaped battery having a cylindrical or coin-shaped metallic housing, or may alternatively be a so-called laminated battery having a resin housing composed of a resin film on which a metal layer is laminated.

As shown for example in FIG. 1, the non-aqueous electrolyte secondary battery 10 comprises a battery housing 11 and an electrode body 14 contained in the battery housing 11. Further, a non-aqueous electrolyte (not shown) is filled inside the battery housing 11. The battery housing 11 is a metallic housing having a substantially rectangular solid shape, which is composed of a housing main body 12 having a tubular shape with a closed bottom and an opening, and a seal plate 13 for closing off the opening of the main body. The electrode body 14 is composed of a positive electrode 15, a negative electrode 16, and a separator 17 located between the positive electrode 15 and the negative electrode 16. The electrode body 14 may be contained in the housing main body 12 in a state in which the side surface and the bottom surface of the electrode body 14 are covered by an insulating holder.

For example, the electrode body 14 may be an electrode body having a winding structure formed by winding the positive electrode 15 and the negative electrode 16 in a spiral shape with the separator 17 located between the electrodes 15 and 16, and the electrode body 14 may have a flat shape. In this case, the positive electrode 15, the negative electrode 16, and the separator 17 are each formed in a belt shape. In consideration of receptivity of lithium ions at the time of charging, the negative electrode 16 is formed somewhat larger than the positive electrode 15. The electrode body 14 may alternatively have a laminated structure in which a plurality of positive electrodes 15 and a plurality of negative electrodes 16 are alternately laminated with a plurality of separators 17 or a single separator 17 folded in zigzag located between the electrodes 15 and 16.

The non-aqueous electrolyte secondary battery 10 includes a positive terminal 18 electrically connected to the positive electrode 15, and a negative terminal 19 electrically connected to the negative electrode 16. In the example shown in FIG. 1, the positive terminal 18 is provided at one end along the lengthwise direction of the seal plate 13, and the negative terminal 19 is provided at the other end along the lengthwise direction of the seal plate 13. For example, through-holes are formed in the seal plate 13 at the mounting positions of the respective terminals, and the terminals are mounted at the through-holes via gaskets made of resin. The non-aqueous electrolyte secondary battery 10 may also include a conductive member connecting between an electrode and a terminal. The seal plate 13 typically comprises a gas discharge valve, an injection inlet for injecting an electrolytic solution, a sealing plug for sealing the injection inlet (all of these not shown), and the like.

In the following, a detailed description is given concerning the respective constituent elements of the non-aqueous electrolyte secondary battery 10, and in particular concerning the negative electrode 16.

[Positive Electrode]

The positive electrode 15 comprises a positive electrode current collector 20 and a positive electrode mixture layer 21 formed on this current collector. As the positive electrode current collector 20, it is possible to use, among others, a foil of a metal such as aluminum which is stable within the potential range of the positive electrode 15, and a film having such a metal deposited on a surface layer of the film. The positive electrode mixture layer 21 includes a positive electrode active material, a conductive material, and a binder, and is formed on both surfaces of the positive electrode current collector 20. The positive electrode 15 may be fabricated by coating the positive electrode current collector 20 with a positive electrode mixture slurry containing the positive electrode active material, the conductive material, and the binder, and, after drying the coated films, rolling the coated films to form the positive electrode mixture layer 21 on the two surfaces of the positive electrode current collector 20.

An example of the positive electrode active material may be a lithium-metal composite oxide containing a metal element such as Co, Mn, Ni, or Al. The metal element constituting the lithium-metal composite oxide may be, for example, at least one selected from Mg, Al, Ca, Sc, Ti, V, Cr, Mn, Fe, Co, Ni, Cu, Zn, Ga, Ge, Y, Zr, Sn, Sb, W, Pb, and Bi. Among these, it is preferable to include at least one selected from Co, Ni, Mn, and Al. Preferred examples of the lithium-metal composite oxide include a lithium-metal composite oxide containing Co, Ni, and Mn, and a lithium-metal composite oxide containing Co, Ni, and Al.

Examples of the conductive material include carbon materials such as carbon black, acetylene black, Ketjen black, graphite, carbon nanotube, carbon nanofiber, and graphene. Examples of the binder include fluoride-containing resins such as polytetrafluoroethylene (PTFE) and polyvinylidenedifluoride (PVdF), polyacrylonitrile (PAN), polyimide, acryl resin, and polyolefin. These resins may be used together with carboxymethylcellulose (CMC) or its salt, polyethyleneoxide (PEO), or the like.

The conductive material content in the positive electrode mixture layer 21 may be, for example, from 0.5 to 15 parts by weight, and is preferably from 1 to 10 parts by weight, relative to 100 parts by weight of the positive electrode active material. When the conductive material content is within this range, good conductivity of the positive electrode mixture layer 21 is easily achieved. The binder content in the positive electrode mixture layer 21 may be, for example, from 0.1 to 10 parts by weight, and is preferably from 0.5 to 5 parts by weight, relative to 100 parts by weight of the positive electrode active material. When the binder content is within this range, good property of binding between the positive electrode active materials, between the positive electrode active material and the conductive material, and between the positive electrode active material and the positive electrode current collector 20, is easily achieved.

[Negative Electrode]

The negative electrode 16 comprises a negative electrode current collector 22 and a negative electrode mixture layer 23 formed on this current collector. As the negative electrode current collector 22, it is possible to use, among others, a foil of a metal such as copper which is stable within the potential range of the negative electrode 16, and a film having such a metal deposited on a surface layer of the film. The negative electrode mixture layer 23 includes a negative electrode active material and a binder, and is formed on both surfaces of the negative electrode current collector 22. The negative electrode 16 may be fabricated by coating the negative electrode current collector 22 with a negative electrode mixture slurry containing the negative electrode active material and the binder, and, after drying the coated films, rolling the coated films to form the negative electrode mixture layer 23 on the two surfaces of the negative electrode current collector 22.

The negative electrode active material is not particularly limited so long as the material can occlude and discharge lithium ions. As the negative electrode active material, it is possible to use, for example, a carbon material such as natural graphite or artificial graphite, a metal that form an alloy with Li such as Si or Sn, and an oxide containing a metal element such as Si or Sn. The negative electrode mixture layer may include a lithium-titanium composite oxide. A lithium-titanium composite oxide functions as the negative electrode active material. When using a lithium-titanium composite oxide, it is preferable to add a conductive material such as a carbon material to the negative electrode mixture layer.

A preferred example of the negative electrode active material is graphite. Graphite may be used together with another negative electrode active material such as an Si-containing compound. As the Si-containing compound, it is preferable to use a silicon oxide represented by $SiO_x$ (where $0.5 \leq x \leq 1.5$). The $SiO_x$ has a structure in which Si is distributed in an amorphous $SiO_2$ matrix. The $SiO_x$ may include lithium silicate (e.g., lithium silicate represented by $Li_{2z}SiO_{(2+z)}$ (where $0<z<2$)) in the particles, and may have a structure in which Si is distributed in a lithium silicate phase. A conductive coating film composed of a material having higher conductivity than $SiO_x$, such as a carbon coating film, is preferably formed on the surface of the $SiO_x$ particles.

Porosity of the negative electrode mixture layer 23 is not particularly limited, and may be from 40 to 60% in a preferred example. When the porosity of the negative electrode mixture layer 23 is within this range, an increase in battery resistance under a low-temperature environment is easily suppressed. While the porosity of the negative electrode mixture layer 23 can be measured by a method shown in the Examples described further below, the method shown in the Examples may be changed as appropriate in accordance with the constituent material of the negative electrode mixture layer 23.

The negative electrode mixture layer 23 includes, as the binder, at least the polymer P comprising a constituent unit A represented by formula (1), a constituent unit B represented by formula (2), and a constituent unit C represented by formula (3). In the polymer P, the molar ratio (l/m) of the constituent unit A to the constituent unit B is from 0.2 to 1.8. By using this polymer P as the binder, good binding property of the negative electrode mixture layer 23 can be achieved simultaneously with low battery resistance under a low-temperature environment. The molar ratio (l/m) is an important factor which controls the binding property of the polymer P with respect to the negative electrode active material and current collector, and which also controls the degree of swelling of the polymer P with the electrolytic solution, wherein this degree of swelling is considered as contributing to ion permeability of the polymer P.

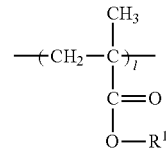

(Formula 1)

[In formula 1, R1 denotes a straight chain alkyl group containing 1 to 4 carbons]

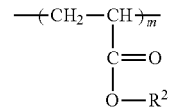

(Formula 2)

[In formula 2, R2 denotes an alkyl group containing 1 to 4 carbons]

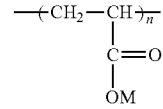

(Formula 3)

[In formula 3, M denotes H and/or a monovalent metal atom]

The molar ratio of the respective constituent units in the polymer P can be measured by the following procedure.

(1) Peel off the negative electrode mixture layer from the negative electrode, disperse the negative electrode mixture layer in water, and remove the active material by leaving to stand or by centrifugation.

(2) Subject the remaining component to filtering with a membrane filter and washing with water to thereby remove CMC and the like, so as to isolate the binder component.

(3) Subject the isolated binder component to pyrolysis gas chromatography to determine the decomposition structure and the quantity. Further, hydrolyze the ester structure of the resin component using an alkali such as sodium hydroxide, and by means of 1H-NMR or 13C-NMR, determine the structure and the quantity of the produced alcohol.

The polymer P content in the negative electrode mixture layer 23 may be, for example, from 0.3 to 3.5 parts by weight, and is preferably from 0.3 to 2.0 parts by weight, relative to 100 parts by weight of the negative electrode active material. When the polymer P content is within this range, it becomes easy to achieve reduction in battery resistance while also achieving good property of binding between the negative electrode active materials and between the negative electrode active material and the negative electrode current collector 22. Water is preferably used as the dispersion medium for the above-noted negative electrode mixture slurry. The polymer P is synthesized as an aqueous dispersion, i.e., an emulsion, and is added to the negative electrode mixture slurry.

The negative electrode mixture layer 23 may include polyacrylonitrile (PAN), carboxymethylcellulose (CMC) or its salt, polyethyleneoxide (PEO), and the like. Among these, a CMC salt (e.g., CMC sodium salt) is preferred. When CMC or its salt is to be added to the negative electrode mixture layer 23, its content may be, for example, from 0.5 to 1.5 parts by weight relative to 100 parts by weight of the negative electrode active material.

The amount of a surfactant having a molecular weight of less than 5000 contained in the negative electrode mixture layer 23 is preferably less than 10 ppm. The content of this surfactant is measured by liquid chromatography (LC) or gas chromatography (GC). Here, "molecular weight" signifies a weight-average molecular weight. While a conventional binder added to the negative electrode mixture layer 23 typically includes a surfactant having a molecular weight of less than 5000, when such a surfactant is present, the surfactant may, for example, be eluted into the electrolytic solution and become a resistance component. As detailed further below, the polymer P can be manufactured by a soap-free emulsion polymerization method which does not use any surfactant. Accordingly, when the polymer P is used as the binder, it is possible to set the surfactant content in the negative electrode mixture layer 23 to less than 10 ppm, and also to less than the limit of measurement by LC and GC, which is, for example, substantially 0%.

In the constituent unit A represented by the above formula (1), R1 denotes a straight chain alkyl group containing 1 to 4 carbons. Examples of a monomer for introducing the constituent unit A into the polymer P (i.e., the monomer A described below) include methyl methacrylate (MMA), ethyl methacrylate (EMA), n-propyl methacrylate (PMA), and n-butyl methacrylate (BMA). In other words, the constituent unit A is a constituent unit derived from the monomer A. When R1 exceeds 4, the degree of swelling of the polymer P with the electrolytic solution decreases, and synthesis of the polymer P by the soap-free emulsion polymerization method becomes difficult.

In the constituent unit B represented by the above formula (2), R2 denotes an alkyl group containing 1 to 4 carbons, and preferably an alkyl group containing 2 to 4 carbons. Examples of a monomer for introducing the constituent unit B into the polymer P (i.e., the monomer B described below) include methyl acylate (MA), ethyl acylate (EA), n-propyl acylate (PA), i-propyl acylate (IPA), n-butyl acrylate (BA), i-butyl acrylate (IBA), and t-butyl acrylate (TBA). In other words, the constituent unit B is a constituent unit derived from the monomer B. When R2 exceeds 4, the degree of swelling of the polymer P with the electrolytic solution decreases, and synthesis of the polymer P by the soap-free emulsion polymerization method becomes difficult. R2 is preferably a straight chain alkyl group containing 1 to 4 carbons, and more preferably a straight chain alkyl group containing 2 to 4 carbons.

In the constituent unit C represented by the above formula (3), M denotes H and/or a monovalent metal atom, and is preferably, at least in part, a monovalent metal atom. A particularly preferable metal element is Li. When M is Li, good dispersion property of the polymer P in water is easily attained, and reduction in battery resistance is facilitated. An example of a monomer for introducing the constituent unit C into the polymer P (i.e., the monomer C described below) is acrylic acid (AA). In other words, the constituent unit C is a constituent unit derived from the monomer C.

When M in the constituent unit C is a monovalent metal atom, the constituent unit C is introduced into the polymer P by neutralizing the acrylic acid component with lithium hydroxide, sodium hydroxide, or the like. In the constituent unit C in the polymer P, M in part may be a monovalent metal atom and M in part may be a hydrogen atom. In this case, the constituent unit C is obtained by partially neutralizing the acrylic acid component.

The polymer P may include other constituent units other than the constituent units A, B, and C to an extent that does not obstruct the aims of the present disclosure, or alternatively, the polymer P may be composed of substantially only the constituent units A, B, and C. When the polymer P includes other constituent units, the molar ratio of the other constituent units is preferably less than 0.1, and more preferably less than 0.01, to the total molar amount of all constituent units of the polymer P.

In the polymer P, the molar ratio (1/m) of the constituent unit A to the constituent unit B is from 0.2 to 1.8, as noted above. The lower limit of the molar ratio (l/m) is more preferably 0.3, and particularly preferably 0.4. Further, the upper limit of the molar ratio (l/m) is more preferably 1.5, and particularly preferably 1.2. When the molar ratio (l/m) is within this range, good binding property is easily obtained, and the peel strength of the negative electrode mixture layer 23 becomes improved. Further, an appropriate degree of swelling with the electrolytic solution is achieved, and the ion permeability becomes enhanced. When the above-noted molar ratio is below 0.2, the strength of the binder film may become reduced, possibly resulting in a decrease in the peel strength of the negative electrode mixture layer 23. On the other hand, when the above-noted molar ratio exceeds 1.8, the binder film may become hard, so that the binding property may become degraded, and also the degree of swelling with the electrolytic solution may decrease.

The molar ratio (n/(l+m+n)) of the constituent unit C to the total molar amount of the constituent units A, B, and C of the polymer P is preferably from 0.02 to 0.20. The lower limit of the molar ratio (n/(l+m+n)) is more preferably 0.03, and particularly preferably 0.04. Further, the upper limit of the molar ratio (n/(l+m+n)) is more preferably 0.16, and particularly preferably 0.12. When the molar ratio (n/(l+m+n)) is within this range, good binding property and stability during manufacture are easily achieved. When this molar ratio is below 0.02, the binding property may become reduced, possibly resulting in degradation of the dispersion property of the polymer P in water. On the other hand, when this molar ratio exceeds 0.20, synthesis of the polymer P may become difficult.

The glass transition temperature (Tg) of the polymer P is preferably from −40 to 30° C. The lower limit of the Tg is more preferably −35° C., and particularly preferably −10° C. Further, the upper limit of the Tg is more preferably 25° C., and particularly preferably 20° C. When the Tg is within this range, good binding property, stability during manufacture, and an appropriate degree of swelling with the electrolytic solution are easily achieved. When the Tg is below 40° C., the strength of the binder film may become reduced, possibly resulting in a decrease in the peel strength of the negative electrode mixture layer 23. On the other hand, when the Tg exceeds 30° C., the binder film may become hard, so that the binding property may become degraded, and also the degree of swelling with the electrolytic solution may become reduced.

It is preferable that, as noted above, the polymer P absorbs the electrolytic solution and swells to an appropriate degree. By swelling, the ion permeability of the polymer P increases, and it is considered that this reduces the transfer resistance of lithium ions at the negative electrode 16. The degree of swelling of the polymer P can be evaluated with a swelling scale factor obtained using a model electrolytic solution. In the present description, a mixed solvent prepared by mixing ethylene carbonate and diethyl carbonate at a volume ratio of 1:1 was used as the model electrolytic solution. A film of the polymer P having a thickness of 50 μm was immersed in the model electrolytic solution for 48 hours, and, based on the ratio of the weights before and after the immersion, the swelling scale factor was obtained.

swelling scale factor=weight of film after immersion (g)/weight of film before immersion (g)

The swelling scale factor of the polymer P is preferably from 1.9 to 40. When the swelling scale factor is within this range, simultaneous achievement of good binding property and ion permeability is facilitated. The lower limit of the swelling scale factor is more preferably 2, and particularly preferably 3. The upper limit of the swelling scale factor is more preferably 35. Further, solubility of the polymer P in the electrolytic solution is preferably from 0 to 3%. When the solubility exceeds 3%, the binding strength of the negative electrode mixture layer 23 may become decreased, for example.

As noted above, the polymer P is preferably provided in the state of an emulsion dispersed in water. The average particle size of the polymer P in water is preferably from 0.1 to 0.7 μm. When the average particle size is within this range, good binding property, stability during manufacture, and an appropriate degree of swelling with the electrolytic solution are easily achieved. The average particle size is a volume-average particle size measured by a laser diffraction method, and signifies a median size at which the volume integral value reaches 50% in the particle size distribution. The average particle size is measured using a laser diffraction/scattering type particle size distribution measurement device (LA-920 manufactured by HORIBA). The lower limit of the average particle size is more preferably 0.2 μm, and particularly preferably 0.3 μm. The upper limit of the average particle size is more preferably 0.6 μm, and particularly preferably 0.5 μm.

The polymer P is obtained at least by radical addition polymerization of the monomer A represented by formula (4), the monomer B represented by formula (5), and the monomer C represented by formula (6).

(Formula 4)

[In formula 4, R1 denotes a straight chain alkyl group containing 1 to 4 carbons]

(Formula 5)

[In formula 5, R2 denotes an alkyl group containing 1 to 4 carbons]

(Formula 6)

[In formula 6, M denotes H and/or a monovalent metal atom]

Specific examples of the monomers A, B, and C are as described above. Here, the molar ratio (A/B) of the monomer A to the monomer B may be, for example, from 0.2 to 1.8. The lower limit of the molar ratio (A/B) is more preferably 0.3, and particularly preferably 0.4. The upper limit of the molar ratio (A/B) is more preferably 1.5, and particularly preferably 1.2.

Further, the molar ratio (C/(A+B+C)) of the monomer C to the total molar amount of the monomers A, B, and C is preferably from 0.02 to 0.20. The lower limit of the molar ratio (C/(A+B+C)) is more preferably 0.03, and particularly preferably 0.04. The upper limit of the molar ratio (C/(A+B+C)) is more preferably 0.16, and particularly preferably 0.12. To an extent that does not obstruct the aims of the present disclosure, other monomers than the monomers A, B, and C may be added.

Since the polymer P is preferably synthesized as an emulsion dispersed in water as noted above, the polymer P is manufactured by, for example, a suspension polymerization method, emulsion polymerization method, dispersion polymerization method, miniemulsion polymerization method, or soap-free emulsion polymerization method, which uses water as the medium. Among the foregoing, the soap-free emulsion polymerization method which does not employ any surfactant is preferably used for the manufacture. The soap-free emulsion polymerization method for the polymer P is performed not only without employing any unreactive surfactant but also without employing any reactive surfactant. By using an emulsion of the polymer P obtained by the soap-free emulsion polymerization method, the amount of surfactant having a molecular weight of less than 5000 in the negative electrode mixture layer 23, which affects the battery characteristics, can be set to less than 10 ppm, or to substantially 0% (i.e., less than the limit of detection).

When a surfactant is to be used at the time of emulsion polymerization, any surfactant that is used for an ordinary emulsion polymerization method can be used. Specific examples include: benzene sulfonate such as dodecyl benzene sulfonate and dodecylphenyl ether sulfonate; alkyl sulfates such as lauryl sulfate, tetradodecyl sulfate, and formaldehyde condensate of alkyl naphthalene sulfonate; sulfosuccinates such as dioctyl sulfosuccinate and dihexyl sulfosuccinate; fatty acid salts such as laurate; alkyl ether carbonates such as polyoxyethylene oleyl ether acetate; ethoxysulfate salts such as polyoxyethylene lauryl ether sulfate salt and polyoxyethylene nonylphenyl ether sulfate salt; alkane sulfonates; alkyl ether phosphate ester salts; alkyl quaternary ammonium salt polyoxyethylene alkyl ether such as stearyltrimethylammonium chloride; and nonionic emulsifiers such as polyoxyethylene nonylphenyl ether, polyoxyethylene sorbitan lauryl ester, and polyoxyethylene-polyoxypropylene block copolymer. Each of these may be used alone, or two or more of these may be used in combination.

The emulsion polymerization method for the polymer P may include, for example, the following steps.

(1) Under agitation by nitrogen gas flow, elevate the temperature of water (ion-exchanged water) filled in a reaction container, and then add a polymerization initiator.

(2) Set the monomers A, B, and C in a dropping funnel, and drop the monomers into the reaction container over a predetermined time.

(3) After completion of the dropping of the monomers A, B, and C, allow the reaction mixture to age as necessary.

(4) Drop a neutralizer such as sodium hydroxide or lithium hydroxide to neutralize the carboxylic acid of the monomer C.

As the polymerization initiator, a water-soluble initiator is preferably used in consideration of polymerization stability. For example, persulfates such as potassium persulfate and ammonium persulfate, or peroxides such as hydrogen peroxide and t-butyl hydroperoxide can be used, Among these, persulfates are preferable, and ammonium persulfate is more preferable. The amount of the polymerization initiator used is preferably 0.01 or more parts by weight, more preferably 0.05 or more parts by weight, and particularly preferably or more parts by weight, relative to the total amount of the monomers. The upper limit of the amount of the polymerization initiator used is preferably 5 parts by weight, more preferably 3 parts by weight, and particularly preferably 1 part by weight.

As the solvent (i.e., the dispersion medium of the polymer P), water such as ion-exchanged water is used. The amount of water may be, for example, from 50 to 1500 parts by weight relative to the total monomer amount of 100 parts by weight. The polymerization conditions are selected as appropriate depending on the types and the like of the polymerization initiator, monomers, and solvent. Typically, the polymerization temperature is from 60 to 100° C., and the polymerization time is from 0.5 to 20 hours. The polymerization is carried out under an atmosphere of inert gas such as nitrogen gas. The agitation conditions are selected as appropriate depending on polymer scale, the shape of the agitation blade, and the like. The agitation rate may be from 20 to 200 rpm, for example.

A reducing agent, such as sulfite or pyrosulfite, that can be used together with the polymerization initiator may be added to the reaction container. Further, a chain transfer agent may be added for adjusting the molecular weight, and a pH adjuster may be added for adjusting the pH. Examples of the chain transfer agent include isopropyl alcohol, n-dodecyl mercaptan, octyl mercaptan, t-butyl mercaptan, thioglycolic acid, thiomalic acid, thiosalicylic acid, and mercaptoethanol. Examples of the pH adjuster include citric acid, sodium citrate, succinic acid, sodium succinate, phosphate, sodium dihydrogen phosphate, and disodium hydrogen phosphate.

[Separator]

A porous sheet having ion permeability and insulation properties is used as the separator 17. Specific examples of the porous sheet include a microporous thin film, woven fabric, and non-woven fabric. As the material of the separator 17, polyethylene, polypropylene, olefin resin such as a copolymer containing at least one of ethylene and propylene, cellulose, and the like are preferred. The separator 17 may be a laminated body having a cellulose fiber layer and a thermoplastic resin fiber layer made of an olefin resin or the like. Further, the separator 17 may be a multilayer separator including a polyethylene layer and a polypropylene layer, which may have an aramid resin or the like applied on the surface of the separator 17. The surface of the separator 17 may have formed thereon a heat resistant layer containing a filler made of an inorganic compound.

[Non-Aqueous Electrolyte]

The non-aqueous electrolyte includes a non-aqueous solvent and electrolyte salt dissolved in the non-aqueous solvent. As the non-aqueous solvent, it is possible to use, for example, an ester, an ether, a nitrile such as acetonitrile, an amide such as dimethylformamide, and a mixed solvent containing two or more of the foregoing. The non-aqueous solvent may contain a halogen-substituted product obtained by substituting at least some of the hydrogens in the above solvents with a halogen atom such as fluorine. Examples of the halogen-substituted product include fluorinated cyclic carbonates such as fluoroethylene carbonate (FEC); fluorinated chain carbonates; and fluorinated chain carboxylates such as fluoro methyl propionate (FMP).

Examples of the above-noted esters include: cyclic carbonates such as ethylene carbonate (EC), propylene carbonate (PC), and butylene carbonate; chain carbonates such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylates such as γ-butyrolactone (GBL) and γ-valerolactone (GVL); and chain carboxylates such as methyl acetate, ethyl acetate, propyl acetate, methyl propionate (MP), and ethyl propionate.

Examples of the above-noted ethers include: cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is preferably lithium salt. Examples of lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (where $1<x<6$, and n is 1 or 2), $LiB_{10}Cl_{10}$, LiCl, LiBr, LiI, chloroborane lithium, lower aliphatic lithium carboxylate, borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ (where l and m are each an integer of 0 or greater). As the lithium salt, a single type among the above may be used alone, or a plurality of types may be mixed and used. Among the foregoing, it is preferable to use $LiPF_6$ in consideration of ion conductivity, electrochemical stability, and the like. The concentration of lithium salt may be, for example, from 0.8 mol to 1.8 mol per 1 liter of the non-aqueous solvent.

EXAMPLES

Although the present disclosure is further described below by reference to examples, the present disclosure is not limited to the examples.

Synthesis Example 1

170 g of ion-exchanged water was introduced into a reaction container including an agitator, a reflux tube, a dropping funnel, a thermometer, and a nitrogen inlet tube, and the temperature was elevated to 70° C. under agitation by nitrogen gas flow. Subsequently, an aqueous solution prepared by dissolving 0.5 g of ammonium persulfate into S g of ion-exchanged water was added. 37 g of methyl methacrylate, 60 g of n-butyl acrylate, and 3 g of acrylic acid were set in the dropping funnel, and dropped into the reaction container at a fixed rate over 3 hours. After completion of the dropping, the reaction mixture was allowed to age for 3 more hours at 70° C. Subsequently, after cooling to 40° C., 14.6 ml of 1N sodium hydroxide aqueous solution was added to partially neutralize the carboxylic acid group derived from the acrylic acid. After removing water from inside the reaction container by distillation under reduced pressure, a small amount of aggregates was removed by mesh filtration to adjust the solid content concentration to 50%, and an emulsion binder was thus obtained. The average particle size of the emulsion (i.e., the polymer particles dispersed in water) was 0.33 μm. Further, the Tg of the polymer constituting the emulsion was −10° C. The obtained polymer contains the constituent units A, B, and C represented by formulas (1) to (3).

Synthesis Examples 2 to 21

By using the monomer components and neutralizers shown in Table 1 and employing the monomer combining ratios shown in Table 1, emulsion binders were obtained by the soap-free emulsion polymerization method carried out in a similar manner to Synthesis Example 1. The solid content concentrations of the emulsion binders were adjusted to 50%. In Synthesis Examples 19 and 20, 2 weight parts of polyoxyethyl lauryl sodium sulfate solution having a solid content concentration of 25% was added, as a surfactant, to the ion-exchanged water introduced into the reaction container. In Synthesis Example 20, EHA denotes 2-ethylhexyl acrylate.

[Measurement of Solid Content]

The amount of solid content in the emulsion binder was measured using an infrared moisture meter (kett FD-240 manufactured by Kett Electric Laboratory) in the automatic mode (60 seconds) under the temperature condition of 120° C., and calculated.

[Calculation of Tg]

The Tg of the polymer constituting the emulsion binder was calculated according to the following Fox equation (T. G. Fox, Bull. Am. Physics Soc., Vol. 1, No. 3, p. 123 (1956)).

$$1/Tg = \Sigma(Wn/Tgn)$$

Here, Tgn denotes the Tg of the homopolymer of each monomer component constituting the polymer, and Wn denotes the mass fraction of each monomer component.

[Measurement of Particle Size]

The particle size of the emulsion (i.e., the polymer particles dispersed in water) was the volume-average particle size (i.e., the median site at which the volume integral value reaches 50%) measured by a laser diffraction method, and was measured using a laser diffraction/scattering type particle size distribution measurement device (LA-920 manufactured by HORIBA) (with relative refractive index of 1.2).

TABLE 1

| | POLYMER COMPOSITION | | | | | | | NEUTRA- | | | PARTICLE | | SWELL- |
| | (A) | | | (B) | | | (C) | LIZING | | | SIZE | Tg | ING SCALE |
| | MMA | EMA | BM | EA | BA | EHA | AA | SURFACTANT | BASE | l/m | n/(l+m+n) | (μm) | (° C.) | FACTOR |
| 1 | 37 | | | | 60 | | 3 | NO | NaOH | 0.79 | 0.047 | 0.33 | −9.7 | 3.6 |
| 2 | 38 | | | | 60 | | 2 | NO | NaOH | 0.81 | 0.032 | 0.38 | −9.7 | 5.0 |
| 3 | 35 | | | | 60 | | 5 | NO | NaOH | 0.75 | 0.078 | 0.29 | −9.7 | 3.3 |
| 4 | 37 | | | | 60 | | 3 | NO | LiOH | 0.79 | 0.047 | 0.4 | −9.7 | 4.5 |
| 5 | | 37 | | | 60 | | 3 | NO | NaOH | 0.71 | 0.049 | 0.32 | −17.6 | 2.5 |
| 6 | 37 | | | 60 | | | 3 | NO | NaOH | 0.62 | 0.041 | 0.39 | 18.6 | 34.6 |
| 7 | 47 | | | | 50 | | 3 | NO | NaOH | 1.20 | 0.046 | 0.36 | 4.3 | 7.0 |
| 8 | 16 | | | | 81 | | 3 | NO | NaOH | 0.25 | 0.050 | 0.34 | −35 | 2.5 |
| 9 | | | 37 | | 60 | | 3 | NO | NaOH | 0.56 | 0.054 | 0.31 | −28 | 1.9 |
| 10 | 30 | | | | 60 | | 10 | NO | LiOH | 0.64 | 0.153 | 0.38 | −9.7 | 2.3 |
| 11 | 35 | | | | 60 | | 5 | NO | LiOH | 0.75 | 0.078 | 0.46 | −9.7 | 3.1 |
| 12 | 37 | | | | 60 | | 3 | NO | NO | 0.79 | 0.047 | 0.36 | −9.7 | 3.5 |
| 13 | 23 | | | 74 | | | 3 | NO | LiOH | 0.31 | 0.041 | 0.43 | 3.8 | 29.4 |
| 14 | 37 | | | 30 | 30 | | 3 | NO | LiOH | 0.69 | 0.044 | 0.45 | 3.8 | 13.4 |
| 15 | 56 | | | | 41 | | 3 | NO | LiOH | 1.75 | 0.045 | 0.41 | 18.3 | 8.1 |
| 16 | 35 | | | 60 | | | 5 | NO | LiOH | 0.58 | 0.068 | 0.45 | 18.6 | 15.5 |

TABLE 1-continued

| | POLYMER COMPOSITION | | | | | | | NEUTRA- | | | | PARTICLE | | SWELL-ING |
|---|---|---|---|---|---|---|---|---|---|---|---|---|---|---|
| | (A) | | | (B) | | | (C) | LIZING | | | | SIZE | Tg | SCALE |
| | MMA | EMA | BM | EA | BA | EHA | AA | SURFACTANT | BASE | l/m | (l + m + n) | (μm) | (° C.) | FACTOR |
| 17 | 37 | | 60 | | | | 3 | NO | LiOH | 0.62 | 0.041 | 0.38 | 18.6 | 33.6 |
| 18 | 47 | | | | 50 | | 3 | NO | LiOH | 1.20 | 0.046 | 0.44 | 4.3 | 6.3 |
| 19 | 37 | | 60 | | | | 3 | YES | NaOH | 0.79 | 0.047 | 0.1 | −9.7 | 8.6 |
| 20 | 47 | | | | | 50 | 3 | YES | NaOH | 1.73 | 0.053 | 0.1 | 12 | 1.7 |
| 21 | 60 | | | | 37 | | 3 | NO | NaOH | 2.08 | 0.045 | 0.1 | 40 | 9.5 |

※ l/m = (number of moles of constituent unit A derived from monomer A)/(number of moles of constituent unit B derived from monomer B)
※ n/(l + m + n) = (number of moles of constituent unit C derived from monomer C)/(total number of moles of respective constituent units A, B, and C derived from monomers A, B, and C)

Example 1

[Fabrication of Positive Electrode]

A lithium-metal composite oxide represented by $LiNi_{0.33}Co_{0.33}Mn_{0.33}O_2$ was used as the positive electrode active material. 100 parts by weight of this positive electrode active material, 8 pans by weight of acetylene black, and 2 parts by weight of PVdF were kneaded using N-methyl-2-pyrrolidone (NMP) as the dispersion medium, to thereby prepare a positive electrode mixture slurry. Next, the positive electrode mixture slurry was applied on both surfaces of a positive electrode current collector made of an aluminum foil having a thickness of 15 μm. After drying the applied films, the applied films (i.e., the positive electrode mixture layers) were rolled using a roll press machine. Subsequently, the product was cut to a predetermined electrode size, and thus a positive electrode having mixture layers formed on its two surfaces was obtained. The amount of the applied positive electrode mixture slurry was 5.5 mg/cm² for each surface of the current collector.

[Fabrication of Negative Electrode]

Graphite was used as the negative electrode active material. 100 parts by weight of this negative electrode active material, 1 part by weight of sodium salt of CMC (CMC-Na), and 0.7 parts by weight of the emulsion binder of Synthesis Example 1 were kneaded using water as the dispersion medium, to thereby prepare a negative electrode mixture slurry. Next, the negative electrode mixture slurry was applied on both surfaces of a negative electrode current collector made of a copper foil having a thickness of 10 μm. After drying the applied films, the applied films (i.e., the negative electrode mixture layers) were rolled using a roll press machine. Subsequently, the product was cut to a predetermined electrode size, and thus a negative electrode having mixture layers formed on its two surfaces was obtained. The amount of the applied negative electrode mixture slurry was 3.8 mg/cm² for each surface of the current collector. Further, the porosity of the negative electrode mixture layers was adjusted to 50%.

[Preparation of Non-Aqueous Electrolyte]

$LiPF_6$ was added to a mixed medium formed by mixing EC. DMC, and EMC at 25° C. at a volume ratio of 30:40:30, to attain a concentration of 1.1 mol/L, and thus a non-aqueous electrolytic solution was prepared.

[Fabrication of Test Cell]

The above-noted positive electrode and negative electrode, to each of which a current collector lead was welded, were wound in a spiral shape with a separator located between the two electrodes, the separator having a three-layer structure composed of layers of polypropylene, polyethylene, and polypropylene. An electrode body having a winding structure was thus fabricated. By placing this electrode body in a battery housing (i.e., a rectangular housing having the dimensions of 13.3 mm×137 mm×62.3 mm) and injecting the above-noted non-aqueous electrolytic solution, a test cell having a design capacity of 4000 mAh was fabricated.

Examples 2 to 27 and Comparative Examples 1 to 3

By using the negative electrode binders shown in Table 2 and adopting the binder addition amounts and negative electrode mixture layer porosities shown in Table 2, test cells were fabricated in a manner similar to Example 1.

[Measurement of Peel Strength]

The negative electrode (after rolling) was cut to a size of 15 mm in width and 120 mm in length, and the 90-degree peel strength of the negative electrode mixture layer was measured in conformity to JIS Z0237.

[Measurement of Battery Capacity]

At 25° C., the test cells were subjected to CCCV charging at 4 A for 2 hours until the battery voltage reached 4.1 V, and were subsequently subjected to CCCV discharging at 4 A for 2 hours until the battery voltage reached 3.0 V. The discharge capacity at that time was noted as the battery capacity. All of the test cells indicated capacities according to the design capacity.

[Measurement of Battery Resistance]

After charging the test cells at 4 A at 25° C. until the battery voltage reached 3.7 V, the test cells were cooled to −10° C. and then charged at 4 A for 10 seconds. The difference between the voltage after 10 seconds from the start of the charging and the OCV before the charging was denoted by ΔV(V), and the battery resistance was calculated from the following equation.

$$R(\Omega) = \Delta V(V)/4(A)$$

[Calculation of Porosity of Negative Electrode Mixture Layer]

After the test cells in the charged state were subjected to CCCV discharging at 4 A for 2 hours until the battery voltage reached 2.5 V, the test cells were disassembled to take out the negative electrodes. Each taken-out negative electrode was washed using EMC and dried. The negative electrode was cut to have an area S, and its thickness t1 and weight m1 were measured. Subsequently, the negative electrode mixture layer was removed, and the thickness t2 and weight m2 of the copper foil serving as the current collector were measured. The volume V1 of the negative electrode mixture layer including pores and the weight M of the mixture layer are calculated from the following equations.

$V1 = S(t1-t2)$ $M = m1 - m2$

Next, TG analysis of the negative electrode mixture (having the mixture weight m3) was performed.

Here, it was assumed that the weight loss m4 up to 120° C. corresponds to adsorbed water, the weight loss m5 from 120° C. to 270° C. corresponds to CMC-Na, the weight loss m6 from 270° C. to 470° C. corresponds to the binder, and the remainder corresponds to the negative electrode active material m7. In this case, the weight ratio of the respective constituent components of the negative electrode mixture is expressed as below.

negative electrode active material:CMC-Na:
binder=$m7/(m3-m4):m5/(m3-m4):m6/(m3-m4)$ Among the weight M of the mixture layer, the weight M1 of the negative electrode active material, the weight M2 of CMC-Na, and the weight M3 of the binder are calculated from the following equations.

$M1 = M \times m7/(m3-m4)$ $M2 = M \times m5/(m3-m4)$ $M3 = M \times m6/(m3-m4)$ Assuming that the true densities of the negative electrode active material, CMC-Na, and binder are respectively denoted by d1, d2, and d3, the following equations are used to calculate the volume v1 of the negative electrode active material, the volume v2 of CMC-Na, the volume v3 of the binder, and the volume V2 of the mixture excluding pores, all of which constitute the mixture layer of the cutout negative electrode.

$v1 = M1/d1$ $v2 = M2/d2$ $v3 = M3/d3$ $V2 = v1 + v2 + v3$

The porosity $\varphi$ of the negative electrode mixture layer is calculated from the following equation.

$\varphi = (V1 - V2)/V1$

TABLE 2

| | BINDER TYPE | BINDER AMOUNT (PARTS BY WEIGHT) | POROSITY OF NEGATIVE ELECTRODE MIXTURE LAYER (%) | PEEL STRENGTH (N/m) | BATTERY RESISTANCE (mΩ) |
|---|---|---|---|---|---|
| EXAMPLE 1 | SYNTHESIS EXAMPLE 1 | 0.7 | 50 | 2.4 | 10.1 |
| EXAMPLE 2 | SYNTHESIS EXAMPLE 2 | 0.7 | 50 | 1.9 | 9.8 |
| EXAMPLE 3 | SYNTHESIS EXAMPLE 3 | 0.7 | 50 | 3.5 | 9.9 |
| EXAMPLE 4 | SYNTHESIS EXAMPLE 4 | 0.7 | 50 | 2.5 | 9.8 |
| EXAMPLE 5 | SYNTHESIS EXAMPLE 5 | 0.7 | 50 | 2.1 | 9.9 |
| EXAMPLE 6 | SYNTHESIS EXAMPLE 6 | 0.7 | 50 | 2.1 | 10.4 |
| EXAMPLE 7 | SYNTHESIS EXAMPLE 7 | 0.7 | 50 | 1.9 | 10.2 |
| EXAMPLE 8 | SYNTHESIS EXAMPLE 8 | 0.7 | 50 | 2.3 | 10.0 |
| EXAMPLE 9 | SYNTHESIS EXAMPLE 9 | 0.7 | 50 | 1.9 | 9.9 |
| EXAMPLE 10 | SYNTHESIS EXAMPLE 10 | 0.7 | 50 | 4.6 | 9.5 |
| EXAMPLE 11 | SYNTHESIS EXAMPLE 11 | 0.7 | 50 | 3.6 | 9.5 |
| EXAMPLE 12 | SYNTHESIS EXAMPLE 12 | 0.7 | 50 | 2.4 | 9.9 |
| EXAMPLE 13 | SYNTHESIS EXAMPLE 13 | 0.7 | 50 | 2.9 | 10.3 |
| EXAMPLE 14 | SYNTHESIS EXMPLE 14 | 0.7 | 50 | 2.4 | 10.1 |
| EXAMPLE 15 | SYNTHESIS EXAMPLE 15 | 0.7 | 50 | 1.8 | 9.9 |
| EXAMPLE 16 | SYNTHESIS EXAMPLE 16 | 0.7 | 50 | 1.7 | 10.0 |
| EXAMPLE 17 | SYNTHESIS EXAMPLE 17 | 0.7 | 50 | 1.6 | 10.2 |
| EXAMPLE 18 | SYNTHESIS EXAMPLE 18 | 0.7 | 50 | 1.9 | 9.5 |
| EXAMPLE 19 | SYNTHESIS EXAMPLE 19 | 0.7 | 50 | 1.4 | 10.8 |
| EXAMPLE 20 | SYNTHESIS EXAMPLE 4 | 0.3 | 50 | 0.9 | 9.4 |
| EXAMPLE 21 | SYNTHESIS EXAMPLE 4 | 1.4 | 50 | 4.2 | 10.3 |
| EXAMPLE 22 | SYNTHESIS EXAMPLE 4 | 2 | 50 | 6.0 | 10.7 |
| EXAMPLE 23 | SYNTHESIS EXAMPLE 4 | 3.5 | 50 | 9.7 | 11.0 |

TABLE 2-continued

| | BINDER TYPE | BINDER AMOUNT (PARTS BY WEIGHT) | POROSITY OF NEGATIVE ELECTRODE MIXTURE LAYER (%) | PEEL STRENGTH (N/m) | BATTERY RESISTANCE (mΩ) |
|---|---|---|---|---|---|
| EXAMPLE 24 | SYNTHESIS EXAMPLE 4 | 0.7 | 60 | 2.4 | 9.5 |
| EXAMPLE 25 | SYNTHESIS EXAMPLE 4 | 0.7 | 40 | 2.5 | 10.3 |
| EXAMPLE 26 | SYNTHESIS EXAMPLE 4 | 0.7 | 32 | 2.4 | 10.7 |
| EXAMPLE 27 | SYNTHESIS EXAMPLE 17 | 0.7 | 32 | 1.6 | 11.0 |
| COMPARATIVE EXAMPLE 1 | SBR | 0.7 | 50 | 1.5 | 11.6 |
| COMPARATIVE EXAMPLE 2 | SYNTHESIS EXAMPLE 20 | 0.7 | 50 | 1.6 | 11.7 |
| COMPARATIVE EXAMPLE 3 | SYNTHESIS EXAMPLE 21 | 0.7 | 50 | 1.5 | — |

As shown in Table 2, it was confirmed that the resistance is reduced in all of the batteries of the Examples compared to the battery of Comparative Example 1. This result is considered to be caused by the ion conductivity of the negative electrode binders. Further, it was observed that the resistance tends to be further reduced when the M in the constituent unit C is Li (as in Examples 1 and 4, 6 and 17, and 7 and 18), and that the peel strength tends to be increased when the amount of the constituent unit C is greater (as in Examples 1 to 3, and 4, 10, and 11). It is considered that the constituent unit C contributes greatly to adhesion between graphite and copper foil.

From Examples 4 and 20 to 23, there was observed the tendency that when the amount of binder is increased, the resistance increases and the capacity decreases. Here, when the amount of binder is less than 03 parts by weight, the peel strength becomes weak, making it difficult to fabricate an electrode. For this reason, in consideration of binding property and resistance reduction, the binder amount is preferably from 0.3 to 2 parts by weight relative to 100 parts by weight of the negative electrode active material.

Further, from Examples 4 and 24 to 26, there was observed the tendency that when the porosity of the negative electrode is decreased, the resistance reducing effect becomes smaller. It is considered that, because the binder swells, the fine pores within the negative electrode mixture layer become too narrow, and the resistance increases. Here, it is difficult to fabricate a negative electrode mixture layer having a porosity exceeding 60%. For this reason, the porosity is preferably from 40 to 60%. With reference to Examples 17 and 27, the resistance reducing effect similarly became smaller when the porosity of the negative electrode was decreased. In comparison to Examples 4 and 24 to 26, it was observed concerning the resistance in Examples 17 and 27 that, when the degree of swelling is higher, while there exists the tendency that the fine pores are more easily blocked, there also exists the tendency that ion permeability is enhanced. It is considered that the rate of increase in resistance resulting from an increase in density becomes lower when the degree of swelling is higher.

From Examples 1 and 19, it was observed that use of a surfactant resulted in a decrease in peel strength and an increase in resistance. The cause is considered to be that the surfactant degrades the function of the binder and hinders the reaction of the active material. Regarding Comparative Example 2, because the alkyl chain of R2 in the constituent unit B is long (the number of carbons is 8), affinity to the solvent is decreased. It is considered that, for this reason, the ion conductivity of the negative electrode binder was reduced, and the resistance was increased. Regarding Comparative Example 3, the molar ratio (l/m) of the constituent unit A to the constituent unit B was 2.08, and the binding property was insufficient, resulting in a low peel strength. The electrode was easily peeled off, so that the battery could not be fabricated.

REFERENCE SIGNS LIST

10 non-aqueous electrolyte secondary battery; 11 battery housing; 12 housing main body; 13 seal plate; 14 electrode body; 15 positive electrode; 16 negative electrode; 17 separator; 18 positive terminal; 19 negative terminal; 20 positive current collector; 21 positive electrode mixture layer; 22 negative current collector; 23 negative electrode mixture layer.

The invention claimed is:

1. A negative electrode for non-aqueous electrolyte secondary battery, the negative electrode comprising a negative electrode mixture layer including a negative electrode active material and a binder, wherein the negative electrode includes, as the negative electrode active material, a silicon oxide represented by $SiO_x$ (where $0.5 \leq x \leq 1.5$), the silicon oxide having a structure in which Si is distributed in an amorphous $SiO_2$, the negative electrode includes, as the binder, at least a polymer comprising a constituent unit A represented by formula (1), a constituent unit B represented by formula (2), and a constituent unit C represented by formula (3), and a molar ratio (l/m) of the constituent unit A to the constituent unit B is from 0.2 to 1.8, and a molar ratio (n/(1+m+n)) of the constituent unit C to a total molar amount of the constituent units A, B, and C of the polymer is from 0.078 to 0.16, wherein:

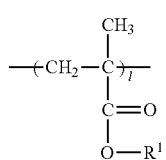

(Formula 1)

in formula 1, R1 denotes a straight chain alkyl group containing 1 to 4 carbons,

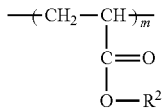

(Formula 2)

in formula 2, R2 denotes an alkyl group containing 1 to 4 carbons, and

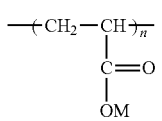

(Formula 3)

in formula 3, M denotes H and/or a monovalent metal atom.

2. The negative electrode for non-aqueous electrolyte secondary battery according to claim 1, wherein an amount of a surfactant having a molecular weight of less than 5000 contained in the negative electrode mixture layer is less than 10 ppm.

3. The negative electrode for non-aqueous electrolyte secondary battery according to claim 1, wherein the M in the constituent unit C of the polymer is Li.

4. The negative electrode for non-aqueous electrolyte secondary battery according to claim 1, wherein a glass transition temperature (Tg) of the polymer is from −40 to 30° C.

5. The negative electrode for non-aqueous electrolyte secondary battery according to claim 1, wherein the polymer has a swelling scale factor of from 1.9 to 40, the swelling scale factor being obtained by immersing the polymer in a solvent prepared by mixing ethylene carbonate and diethyl carbonate at a volume ratio of 1:1.

6. The negative electrode for non-aqueous electrolyte secondary battery according to claim 1, wherein a porosity of the negative electrode mixture layer is from 40 to 60%.

7. The negative electrode for non-aqueous electrolyte secondary battery according to claim 1, wherein a contained amount of the polymer in the negative electrode mixture layer is from 0.3 to 2 parts by weight relative to 100 parts by weight of the negative electrode active material.

8. A non-aqueous electrolyte secondary battery comprising the negative electrode for non-aqueous electrolyte secondary battery according to claim 1.

* * * * *